3,025,221
MICROBIOLOGICAL PRODUCTION OF CAROTENE IN A MEDIUM COMPRISING KEROSENE

Alex Ciegler, Harlow H. Hall, and George E. N. Nelson, Peoria, Ill., assignors to the United States of America as represented by the Secretary of Agriculture
No Drawing. Filed Oct. 19, 1960, Ser. No. 63,697
2 Claims. (Cl. 195—28)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention pertains to an improvement in the process of producing beta-carotene by submerged aerobic fermentation of *Blakeslea trispora*.

More specifically, this invention relates to the process of producing beta-carotene by submarged aerobic fermentation of a *Blakeslea trispora* inoculum in a medium which is markedly improved by the addition of a small proportion of a commercial kerosene-type petroleum fraction hydrocarbon thereto.

As shown in Anderson, U.S. 2,890,989, it is known to produce fairly good yields of beta-carotene by the submerged aerobic fermentation of *Blakeslea trispora* in an aqueous nutrient medium comprising an assimilable carbon and nitrogen source such as grains, a thiamin source, mineral salts (tap water), a natural fat or oil, a surface-active agent, and beta-ionone which latter is added 48 hours after starting the fermentation.

In an effort to further improve the yields of beta-carotene in the above fermentation process, we have now discovered that by adding a small proportion of a kerosene-type petroleum fraction hydrocarbon to the culture medium at zero to 48 hours after starting the fermentation, the production of beta-carotene is greatly increased.

The principal object of this invention, accordingly, is an improvement in the fermentation medium so that the production of beta-carotene therein is greatly increased.

As will be apparent from the results shown in the examples, we have now discovered that the addition of about 5 percent of a kerosene-type petroleum fraction hydrocarbon initially or after 24 or 48 hours to a fermentation of *Blakeslea trispora* greatly augments the production of beta-carotene therein.

EXAMPLE 1

A medium having the following composition was prepared:

Acid-hydrolyzed soybean meal[1] _____gm__ 47
Acid-hydrolyzed corn meal[1] _____gm__ 23
Choice white grease _____ml__ 50
Non-ionic detergent (a tertiary octylphenoxy poly(ethyleneoxy) ethanol) _____ml__ 1.2
Thiamin HCl _____gm__ 0.002
Tap water, q. s. ad _____ml__ 1000

[1] Autoclaved for 90 min. in 0.2 N $H_2SO_4$ and then adjusted to pH 6.5 with NaOH.

100 ml. aliquots of the medium were placed in a series of 500 ml. conical flasks which were then plugged, sterilized, and cooled. Each flask was then inoculated with 4 ml. of each of a 48 hr. culture of *Blakeslea trispora*, NRRL 9216 and *Blakeslea trispora* NRRL 9159, and agitated on a Gump rotary shaker at 200 r.p.m. at 29° C. To experimental flasks at zero hrs., 24 hrs., or 48 hrs. respectively, 5 ml. of sterile kerosene was added and shaking resumed. Also at 48 hours 0.1 ml. of sterile β-ionone was added to all flasks. Shaker incubation was continued to a total fermentation time of 144 hours before individually harvesting the mycelia from each flask by filtration followed by drying in a vacuum oven at 55° C. The individual yields were then ground in a Wiley mill, extracted with petroleum ether (B.P. 33° C. to 57° C.), and the extracts compared spectrophotometrically with an authentic sample of beta-carotene in the same solvent, the results being shown in Table I.

Table I

| Percent kerosene added | Time added (hrs.) | Micrograms β-carotene per 100 ml. culture |
|---|---|---|
| Control (none) | | 47,825 |
| 5 | Added at start of fermentation (zero hrs.). | 28,900 |
| 5 | 24 | 55,817 |
| 5 | 48 | 60,383 |

EXAMPLE 2

The experiment of Example 1 was repeated with the exception that the commercial kerosene hydrocarbon solvent of Example 1 was substituted by a commercial kerosene-type petroleum fraction hydrocarbon solvent characterized by an initial B.P. of 386° F., an end B.P. of 484° F., a sp. gr. of 0.775–0.788 at 60° F., an API gravity of 49.8, a refractive index at 20° C. of 1.4334, a flash point (closed cup at 0° F.) of 135/145, a kauri butanol number of 29, an aniline pt. of 175° F., a pour point of −25° F., and a zero iodine number). This results with this solvent are shown in Table II.

Table II

| Percent of specific commercial fraction added | Time added (hrs.) | Micrograms β-carotene per 100 ml. culture |
|---|---|---|
| Control (none) | | 48,908 |
| 5 | added at start of fermentation (zero hrs.) | 81,736 |
| 5 | 48 | 74,290 |

EXAMPLE 3

The experiment of Example 1 was repeated with the exception that the kerosene of Example 1 was substituted by a commercial kerosene-type petroleum fraction characterized by an initial B.P. of 383° F., and end B.P. of 415° F., a specific gravity at 60° F. of 0.7852, an API gravity of 48.7, a refractive index of 1.4322 at 20° C., a flash point (closed cup at 0° F.) of 160° F., a kauri butanol number of 30, an aniline point of 169° F., and an iodine number of 6.5). The results are set forth in Table III.

Table III

| Percent of specific commercial fraction added | Time added (hrs.) | Micrograms β-carotene per 100 ml. culture |
|---|---|---|
| Control (none) | | 43,000 |
| 5 | Added at start of fermentation (zero hrs.) | 75,950 |

EXAMPLE 4

The experiment of Example 1 was repeated with the exception that the kerosene was substituted by a commercial kerosene-type hydrocarbon solvent characterized by an initial B.P. of 376° F., an end B.P. of 468° F., a sp. gr. at 60° F. of 0.7896, an API gr. of 47.7 a refractive index at 20° C. of 1.4360, a flash point (closed cup) of 155° F., a kauri butanol number of 31, an aniline point of 161° F., and an iodine number of 10. The results are set forth in Table IV.

Table IV

| Percent of specific commercial fraction added | Time added (hrs.) | Micrograms β-carotene per 100 ml. culture |
|---|---|---|
| Control (none) | Added at start of fermentation (zero hrs.) | 43,000 |
| 5 | | 50,475 |
| 5 | 48 | 58,700 |

EXAMPLE 5

In this experiment flasks containing 150 ml. aliquots of a fermentation medium corresponding to that of Example 1 but also containing 5 percent kerosene were respectively inoculated with 4 ml. of a 6-day culture of Blakeslea trispora NRRL 9159 or NRRL 9216. The flasks were incubated at 28° C. on a Gump shaker rotating at 200 r.p.m. for 48 hours, and then a flask containing a kerosene-exposed culture of Blakeslea trispora NRRL 9159 was combined with one containing a kerosene-exposed culture of NRRL 9216. Then 10 ml. aliquots of the combined culture were used to inoculate fresh flasks of the fermentation medium of Example 2 containing 5 percent of the specific solvent. Under the same fermentation conditions as in Example 2, the results presented in Table V were obtained, thus showing that even better yields are obtained if stock sub-cultures are exposed to a kerosene-type material.

Table V

| Percent kerosene in inoculum | Percent specific fraction of Experiment 2 added | Micrograms β-carotene per 100 ml. of culture |
|---|---|---|
| None | None | 45,150 |
| None | 5 | 70,325 |
| 1 | 5 | 93,000 |
| 3 | 5 | 91,500 |
| 5 | 5 | 76,775 |

EXAMPLE 6

The experiment of Example 2 was repeated with the exception that the concentration of choice white grease was varied between 3 percent and 8 percent. The results appear in Table VI, and show that the solvent and the white grease are not functional equivalents.

Table VI

| Percent specific fraction of Example 2 added | Percent white grease | Micrograms β-carotene per 100 ml. of culture |
|---|---|---|
| 0 | 3 | 22,700 |
| 0 | 4 | 33,700 |
| 0 | 5 | 46,400 |
| 0 | 6 | 43,700 |
| 0 | 7 | 41,470 |
| 0 | 8 | 39,800 |
| 5 | 3 | 42,830 |
| 5 | 4 | 61,570 |
| 5 | 5 | 84,000 |
| 5 | 6 | 87,230 |
| 5 | 7 | 69,200 |
| 5 | 8 | 56,570 |

Having disclosed our invention, we claim:

1. In the method of producing β-carotene by fermenting on organism from the group consisting of Blakeslea trispora NRRL 9159, Blakeslea trispora NRRL 9216, and mixtures thereof in a tap water fermentation medium comprising neutralized cereal grain hydrolysate, white grease, a nonionic detergent, thiamine, and β-ionone, the improvement comprising the steps of adding about 5% by volume (based on the fermentation medium) of a petroleum hydrocarbon fraction at up to about 48 hours after beginning the fermentation, said petroleum hydrocarbon fraction being selected from the group consisting of kerosene and kerosene fractions characterized by having an initial B.P. of 376–386° F., an end B.P. of 415–484° F., a sp. gr. at 60° F. of 0.775–0.789, an API gravity of 47.7–49.8, a refractive index at 20° C. of 1.4322–1.4360, a closed cup flash point of 135–150° F., a kauri butanol number of 29–31, an aniline point of 161–175° F., and an iodine number of 0–10, and continuing the fermentation to a total period of about 144 hours.

2. In the method of producing β-carotene by fermenting an organism selected from the group consisting of Blakeslea trispora NRRL 9159, Blakeslea trispora NRRL 9216, and mixtures thereof in an aqueous nutrient medium, the improvement comprising adding about 5% by volume (based on the fermentation medium) of a petroleum hydrocarbon fraction to said medium during fermentation, said hydrocarbon fraction being a member of the group consisting of kerosene and kerosene fractions characterized by having an initial B.P. of 376–286° F., and end B.P. of 415–484° F., a sp. gr. at 60° F. of 0.775–0.789, an API gravity of 47.7–49.8, a refractive index at 20° C. of 1.4322–1.4360, a closed cup flash point of 135–160° F., a kauri butanol number of 29–31, an aniline point of 161–175° F., and an iodine number of 0–10.

No reference cited.